United States Patent
Xiang

(10) Patent No.: US 9,350,181 B2
(45) Date of Patent: May 24, 2016

(54) EFFICIENT ELECTRONIC CIGARETTE CHARGING DEVICE AND METHOD FOR USING THE SAME

(71) Applicant: Zhiyong Xiang, Shenzhen (CN)

(72) Inventor: Zhiyong Xiang, Shenzhen (CN)

(73) Assignee: HUIZHOU KIMREE TECHNOLOGY CO., LTD. SHENZHEN BRANCH, Shenzhen (CN)

( * ) Notice: Subject to any disclaimer, the term of this patent is extended or adjusted under 35 U.S.C. 154(b) by 226 days.

(21) Appl. No.: 13/968,102

(22) Filed: Aug. 15, 2013

(65) Prior Publication Data

US 2014/0354231 A1     Dec. 4, 2014

(30) Foreign Application Priority Data

May 28, 2013    (CN) .......................... 2013 1 0204515

(51) Int. Cl.
     *H02J 7/00*      (2006.01)
     *H02J 7/32*      (2006.01)

(52) U.S. Cl.
     CPC ................. *H02J 7/0042* (2013.01); *H02J 7/32* (2013.01); *Y02B 40/90* (2013.01)

(58) Field of Classification Search
     CPC ....................................................... H02J 7/0042
     USPC ........................................................... 320/114
     See application file for complete search history.

(56) References Cited

U.S. PATENT DOCUMENTS

2011/0273132 A1*    11/2011    Khaitan ................ H01M 10/46
                                                                  320/101

* cited by examiner

*Primary Examiner* — Thuan Do
(74) *Attorney, Agent, or Firm* — Tim Tingkang Xia, Esq.; Locke Lord LLP

(57) ABSTRACT

An efficient electronic cigarette charging device and a method for efficiently charging an electronic cigarette are provided, the device comprises an electronic cigarette case and a battery rod, the battery rod includes a charging management unit and an electronic cigarette battery unit, the electronic cigarette case includes an electronic cigarette case battery unit, a current sample unit, a micro-control unit and a adjustable voltage output unit, the current sample unit is configured to sample actual charging current the charging management unit to the electronic cigarette battery, and the micro-control unit is configured to compare the actual charging current with default battery constant charging current, and further control the adjustable voltage output unit to adjust the charging voltage output.

8 Claims, 6 Drawing Sheets

EFFICIENT ELECTRONIC CIGARETTE CHARGING DEVICE AND METHOD FOR USING THE SAME

CROSS-REFERENCE TO RELATED APPLICATIONS

This non-provisional application claims priority under 35 U.S.C. §119(a) on Patent Application No. 201310204515.9 filed in P.R. China on May 28, 2013, the entire contents of which are hereby incorporated by reference.

TECHNICAL FIELD

The present invention relates to rechargeable electrical cigarettes, and more particularly, relates to an efficient electronic cigarette charging device and a method for using the same.

BACKGROUND

At present, most of rechargeable electronic cigarettes in the market have charging managements integrated therein, and charging modes of these electronic cigarettes with charging managements are all linear constant current charging modes. As shown in FIG. 1, charging outputs of most cigarette cases in the market are constant voltage modes, for example, the voltage of a constant voltage output is 5V. When such a cigarette case charges rechargeable battery rods by means of linear constant current modes, the efficiency is very low, and the cigarette case can only charge a few rechargeable battery rods. Power loss generated in the process of charging the battery rods using the battery of the cigarette case is great, and the efficiency is only about 50%~65%. The charging efficiency is calculated as follows: (efficiency of DC-DC)*(efficiency of linear charging). For example, when the efficiency of DC-DC (i.e., the efficiency of boosting the battery voltage to 5V) is 85%, and the efficiency of linear charging is 3.7/5=74%, the total efficiency is 85%*74%=59%.

In order to ensure a high charging efficiency, constant charging current should be firstly ensured. The charging current is relevant to a voltage difference between the battery voltage and the charging voltage, wherein, the smaller the voltage difference is, the higher efficiency is achieved. However, in the prior art, electronic cigarette cases charge battery rods of electronic cigarettes by means of constant voltage modes, and the charging efficiency is very low.

Therefore, there are drawbacks in the prior art, and they need to be overcome.

BRIEF SUMMARY

To overcome the drawbacks that the constant voltage charging efficiency is low, the objective of the present invention is to provide an efficient electronic cigarette charging device and a method for using the same.

The technical solutions of the present invention for solving the technical problems are as follows:

An efficient electronic cigarette charging device is provided, which comprises an electronic cigarette case and a battery rod; the battery rod includes a charging management unit and an electronic cigarette battery unit, and the electronic cigarette case includes an electronic cigarette case battery unit; the electronic cigarette case further includes a current sample unit, a micro-control unit, and an adjustable voltage output unit;

the adjustable voltage output unit is connected to the electronic cigarette case battery unit, the micro-control unit, and the charging management unit respectively, and the current sample unit is connected to the charging management unit and the micro-control unit respectively;

the current sample unit is configured to sample actual charging current of the charging management unit, and the micro-control unit is configured to determine whether a difference between default battery constant charging current and the actual charging current is within a preset range, and is further configured to control transmission of voltage regulation control signals and thereby control the adjustable voltage output unit to adjust a charging voltage output to the charging management unit.

In the efficient electronic cigarette charging device of the present invention, the adjustable voltage output unit includes a DC-DC first output circuit and a voltage regulation output circuit;

an input port of the DC-DC first output circuit is connected to an output port of the electronic cigarette case battery unit, a first input port of the voltage regulation output circuit is connected to an output port of the DC-DC first output circuit, a second input port of the voltage regulation output circuit is connected to an output port of the micro-control unit, an output port of the voltage regulation output circuit is connected to an input port of the charging management unit;

the voltage regulation control signal is a duty radio adjustable PWM signal;

the DC-DC first output circuit is configured to convert a power signal provided by the electronic cigarette case battery unit to a stable DC voltage and output the stable DC voltage, and the voltage regulation output circuit is configured to adjust the stable DC voltage according to the duty radio adjustable PMW signal and generate the charging voltage that is adjusted.

In the efficient electronic cigarette charging device, the stable DC voltage is 5V.

In the efficient electronic cigarette charging device of the present invention, the voltage regulation output circuit includes a MOS transistor and a capacitor, a drain of the MOS transistor is connected to the charging management unit, a source of the MOS transistor is connected to the DC-DC first output circuit, a gate of the MOS transistor is connected to the microcontroller, one end of the capacitor is connected to the drain of the MOS transistor, and the other end of the capacitor is grounded; and the MOS transistor is configured to receive the stable DC voltage using the source thereof and receive the duty radio adjustable PWM signal using the gate thereof, and thereby control the conduction and cut-off of the MOS transistor, and further control the charging voltage.

In the efficient electronic cigarette charging device of the present invention, the MOS transistor is a P-type MOS transistor.

In the efficient electronic cigarette charging device of the present invention, a type of the MOS transistor is AO3401.

In the efficient electronic cigarette charging device of the present invention, the micro-control unit includes a microcontroller and a first resistor; a type of the microcontroller is SN8P2711B; a PWM1 pin of the microcontroller is connected to one end of the first resistor and the gate of the MOS transistor respectively, and the PWM1 pin of the microcontroller outputs the duty radio adjustable PWM signal; the other end of the first resistor is connected to the source of the MOS transistor, a VSS pin of the microcontroller is grounded, and a VDD pin of the microcontroller is connected to a power signal Vbat.

In the efficient electronic cigarette charging device of the present invention, the current sample unit includes a sampling resistor, one end of the sampling resistance is grounded, and the other end is connected to the charging management unit and a P4.4 pin of the microcontroller respectively.

In the efficient electronic cigarette charging device of the present invention, the resistance of the sampling resistor is 1-2Ω.

In the efficient electronic cigarette charging device of the present invention, the adjustable voltage output unit includes a DC-DC second output unit circuit and a digital potentiometer, a first input port of the DC-DC second output circuit is connected to an output port of the electronic cigarette case battery unit, a second input port of the DC-DC second output circuit is connected to an output port of the digital potentiometer, an output port of the DC-DC second output circuit is connected to an input port of the charging management unit, and an input of the digital potentiometer is connected to an output port of the micro-control unit;

the voltage regulation control signal is a voltage regulation digital control signal;

the digital potentiometer is configured to adjust a resistance of an output sampling feedback resistor of the DC-DC second output circuit according to the voltage regulation digital control signal, and to make the DC-DC second output circuit output the charging voltage that is real-timely adjusted.

A method for efficiently charging an electronic cigarette is also provided; the method comprises the following steps:

S1, a current sample circuit sampling actual charging current of a charging management unit;

S2, a micro-control unit determining whether a difference between default battery constant charging current and the actual charging current is within a preset range;

S3, if the difference is within the preset range, executing the step S1; if the difference is out of the preset range, the micro-control unit outputting a voltage regulation control signal;

S4, an adjustable voltage output unit adjusting a charging voltage output to the charging management unit according to the voltage regulation control signal, and then executing the step S1.

In the method for efficiently charging the electronic cigarette of the present invention, in the step S3, the voltage regulation control signal is a duty radio adjustable PWM signal.

In the method for efficiently charging the electronic cigarette of the present invention, in the step S3, the voltage regulation control signal is a voltage regulation digital control signal.

In the method for efficiently charging the electronic cigarette of the present invention, the step S4 specifically includes:

S41, a DC-DC first output circuit converting a power signal provided by an electronic cigarette case battery unit to a stable DC voltage and outputting the stable DC voltage;

S42, a voltage regulation output circuit regulating the stable DC voltage according to the duty radio adjustable PMW signal and generating the charging voltage that is adjusted.

In the method for efficiently charging the electronic cigarette of the present invention, the step S4 specifically includes:

S41', a digital potentiometer receiving the voltage regulation digital control signal and adjusting a resistance of a sampling feedback resistor of a DC-DC second outputting circuit;

S42', the DC-DC second output circuit outputting the charging voltage that is real-timely adjusted to the charging management unit.

When implementing the efficient electronic cigarette charging device and the method for using the same, the following advantageous effects can be achieved: the micro-control unit determines whether the difference between the preset battery constant charging current and the actual charging current is within the preset range, controls the transmission of the voltage regulation control signal, and further controls the adjustable voltage output unit to adjust the charging voltage output to the charging management unit, so that the actual charging current is equal to or slightly less than the battery constant charging current. By reducing the charging voltage difference between the charging voltage and the voltage of the electronic cigarette battery rod unit, the charging efficiency is improved.

BRIEF DESCRIPTION OF THE DRAWINGS

The present invention will be further described with reference to the accompanying drawings and embodiments in the following, in the accompanying drawings.

DETAILED DESCRIPTION OF THE PREFERRED EMBODIMENT

In order to make the technical feature, the propose and the technical effect of the present invention more clearly, the present invention will now be described in detail with reference to the accompanying drawings and embodiments.

Electronic cigarette battery rods with linear charging managements integrated therein have a feature: when an external charging voltage of a battery rod gets close to a voltage of a battery in the battery rod from high to low, an internal charging control circuit (i.e. the charging management unit 210 in the present invention) will reduce a voltage drop between an input (i.e. the charging voltage in the present invention) and an output (i.e. the battery voltage of the electronic cigarette battery unit in the present invention) to be as low as possible, so that charging current is kept being constant. At this moment, the actual charging current is slightly less than the constant charging current, and a voltage difference between the external charging voltage and the internal charging voltage reaches to the minimum thereof, which is approximately 0.2V. In order to ensure a high charging efficiency, constant charging current should be firstly ensured. The actual charging current is relevant to a voltage difference between the battery voltage and the charging voltage, and the smaller the voltage difference is, the higher efficiency is achieved. Therefore, the present invention adjusts the voltage drop between the input and the output in real time, and makes the actual charging current be slightly less than or equal to the battery constant charging current, thus the charge efficiency is improved.

Figure 1:
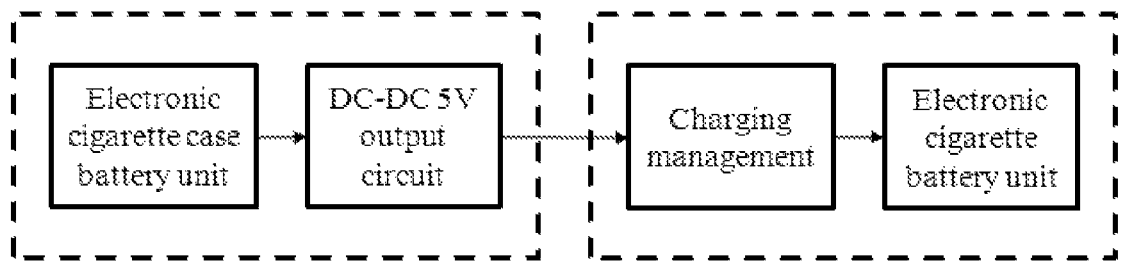
FIG. 1 illustrates a schematic view of charging a battery rod using an electronic cigarette case in the prior art.
Figure 2:
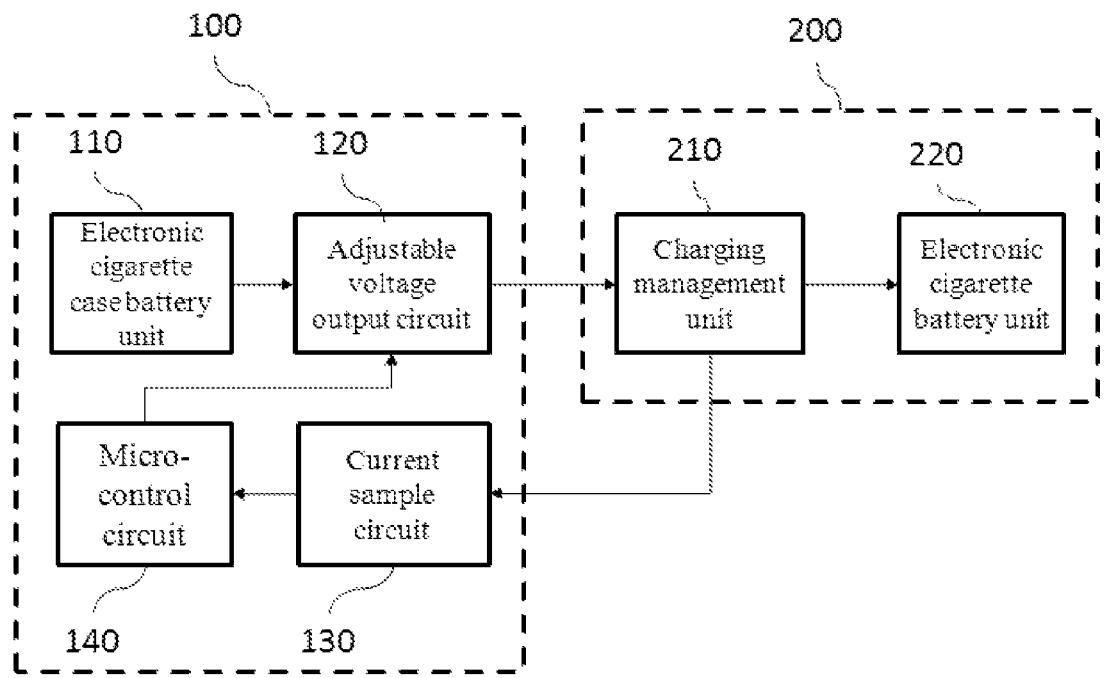
FIG. 2 illustrates a schematic view of an efficient electronic cigarette charging device of the present invention.

As shown in FIG. 2, which is a schematic view of an efficient electronic cigarette charging device in the present invention.

The efficient electronic cigarette charging device of the present invention comprises an electronic cigarette case 100 and a battery rod 200.

The battery rod 200 includes a charging management unit 210 and an electronic cigarette battery unit 220. The charging management unit 210 is configured to control the battery rod 200 to be charged by a preset constant battery charging current.

The electronic cigarette case 100 includes an electronic cigarette case battery unit 110, a current sample unit 130, a micro-control unit 140, and an adjustable voltage output unit 120.

The adjustable voltage output unit 120 is connected to the electronic cigarette battery unit 110, the micro-control unit 140 and the charging management unit 210 respectively, and the current sample unit 130 is connected to the charging management unit 210 and the micro-control unit 140 respectively.

The current sample unit 130 is configured to sample actual charging current of the charging management unit 210, and the micro-control unit 140 is configured to determine whether a difference between default constant battery charging current and the actual charging current is within a preset range, and is further configured to control the transmission of voltage regulation control signals, thereby controlling the adjustable voltage output unit 120 to adjust a charging voltage output to the charging management unit 210, so that the actual charging current is equal to or slightly less than the constant battery charging current. By reducing the charging voltage difference between the charging voltage and the voltage of the electronic cigarette battery rod unit 220, the charging efficiency is improved.

The preset range is (0-50%)*the battery constant charging current. Preferably, the preset range is (0-10%)*the battery constant charging current in the first embodiment.

Figure 3:
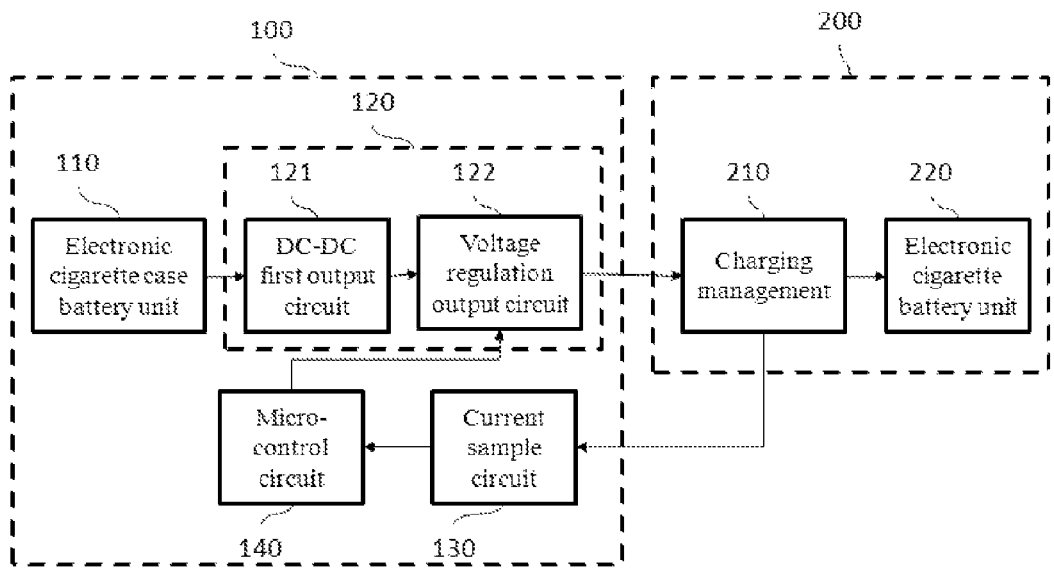
FIG. 3 illustrates a schematic view of an efficient electronic cigarette charging device according to a first embodiment of the present invention.

Specifically, if the difference between the constant battery charging current and the actual charging current is out of the preset range (generally, the actual charging current is less than or equal to the constant charging current), the adjustable voltage output unit 120 is controlled to improve the charging voltage. As shown in FIG. 3, which is a schematic view of an efficient electronic cigarette charging device according to a first embodiment of the present invention. In the first embodiment, the efficient electronic cigarette charging device comprises an electronic cigarette case 100 and a battery rod 200.

The battery rod 200 includes a charging management unit 210 and an electronic cigarette battery unit 220.

The electronic cigarette case 100 includes an electronic cigarette case battery unit 110, a current sample unit 130, a micro-control unit 140 and an adjustable voltage output unit 120; wherein, the adjustable voltage output unit 120 includes a DC-DC first output circuit 121 and a voltage regulation output circuit 122.

An input port of the DC-DC first output circuit 121 is connected to an output port of the electronic cigarette case battery unit 110, an output port of the DC-DC first output circuit 121 is connected to a first input port of the voltage regulation output circuit 122, an output port of the voltage regulation output circuit 122 is connected to an input port of the charging management unit 210, a first output port of the charging management unit 210 is connected to an input port of the current sample unit 130, a second output port of the charging management unit 210 is connected to an input port of the electronic cigarette battery unit 220, an output port of the current sample unit 130 is connected to an input port of the micro-control unit 140, and an output port of the micro-control unit 140 in connected to a second input port of the voltage regulation output circuit 120.

The electronic cigarette case battery unit 110 provides a charge power signal to the DC-DC first output circuit 121, and the DC-DC first output circuit 110 converts the charge power signal to a stable DC voltage. The current sample unit 130 is configured to sample actual charging current of the charging management unit 210. The micro-control unit 140 is configured to determine whether a difference between default constant battery charging current and the actual charging current is within a preset range, and is configured to control the transmission of voltage regulation control signals. The voltage regulation output circuit 122 adjusts the stable DC voltage real-timely according to the voltage regulation control signals, and outputs the adjusted charging voltage to the charging management unit 210, so that the actual charging current is equal to or slightly less than the constant battery charging current. By reducing the charging voltage difference between the charging voltage and the voltage of the electronic cigarette battery rod unit 220, the charging efficiency is improved. Specifically, in the first embodiment, the voltage regulation control signal is a duty radio adjustable PWM signal.

In the present embodiment, the stable DC voltage is 5V.

Figure 4:
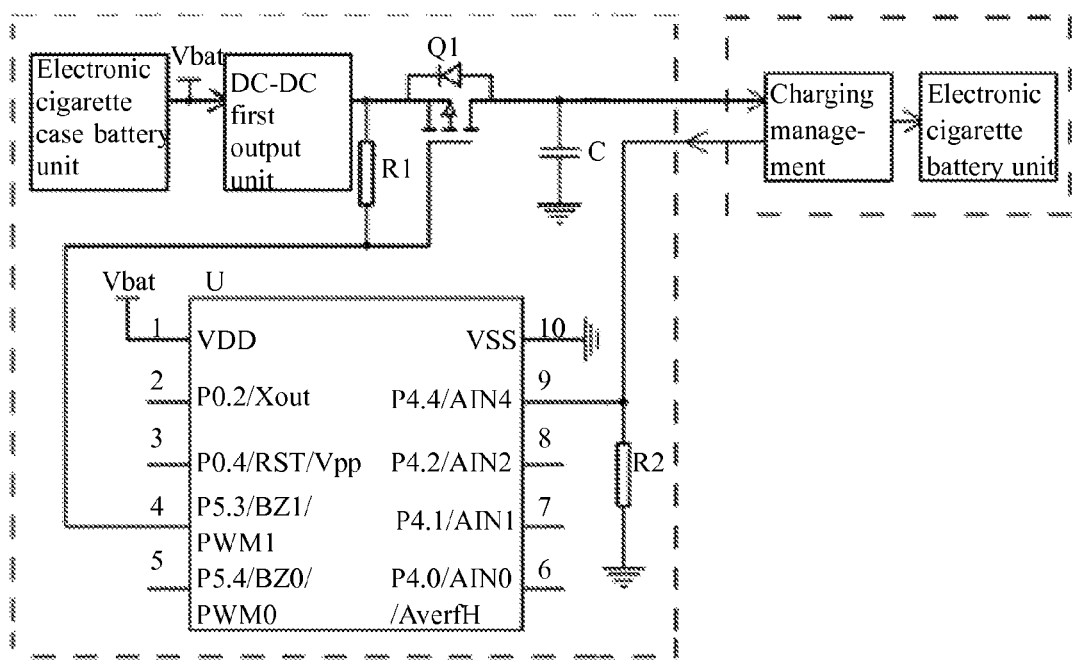
FIG. 4 illustrates a circuit diagram of the efficient electronic cigarette charging device according to the first embodiment of the present invention.

As shown in FIG. 4, which is a circuit diagram of the efficient electronic cigarette charging device, according to the first embodiment of the present invention.

The voltage regulation output circuit 122 includes a MOS transistor Q1, and a capacitor C. The MOS transistor is a P-type MOS transistor, and a type of the MOS transistor is AO3401. The micro-control unit 140 includes a microcontroller U1 and a first resistor R1, and a type of the microcontroller U1 is SN8P2711B.

The current sample unit 130 includes a sampling resistor R2, the resistance of the sampling resistor R2 is small, and is generally 1-2Ω. Preferably, in the present embodiment, the resistance is 1Ω.

A drain of the MOS transistor Q1 is connected to the charging management unit 210, a source of the MOS transistor Q1 is connected to the DC-DC first output circuit 121, and a gate of the MOS transistor Q1 is connected to a PWM1 pin of the microcontroller U1. One end of the capacitor C is connected to the drain of the MOS transistor Q1, and the other end of the capacitor C is grounded. A PWM1 pin of the microcontroller U1 is connected to one end of the first resistor R1. The PWM1 pin of the microcontroller U1 outputs the duty radio adjustable PWM signal. The other end of the first resistor R1 is connected to the source of the MOS transistor Q1. A VSS pin of the microcontroller U1 is grounded, and a VDD pin of the microcontroller U1 is connected to a power signal Vbat.

One end of the sampling resistor R2 is grounded, and the other end of the sampling resistor R2 is connected to the charging management unit 210 and a P4.4 pin of the microcontroller U1 respectively.

The MOS transistor Q1 is configured to receive the stable DC voltage using the source thereof and receive the duty radio adjustable PWM signal using the gate thereof, and thereby control the conduction and cut-off of the MOS transistor Q1. According to the sampled actual charging current, the microcontroller U1 calculates the corresponding duty radio thereof, generates the duty radio adjustable PWM signal, and controls the actual charging current for charging the battery to be just less than the constant battery charging current. When the MOS transistor Q1 is conducted, the stable DC voltage charges the capacitor C. When the MOS transistor is cut-off, the capacitor C discharges the energy accumulated in the charging process, and outputs the charging voltage.

Specifically, if the difference between the constant battery charging current and the actual charging current is out of the preset range (generally, the actual charging current is less than or equal to the constant charging current), the microcontroller U1 controls the duty radio of the duty radio adjustable PWM signal to increase, and further controls the voltage regulation output circuit 122 to increase the charging voltage. For example, if the constant battery charging current is 100 mA, in the first embodiment, the preset range preferred is (0-10%)*the battery constant charging current, that is, 0-10 mA.

If the actual charging current sampled by the sample unit is 60 mA, the actual charging current is less than the constant battery charging current, and the difference between the actual charging current and the constant battery charging current is out of the preset range. On this occasion, the actual charging current should be increased apparently, and the charging voltage should be boosted correspondingly. Therefore, in order to control the actual charging current output reaches to 90 mA, the microcontroller U1 should boost the charging voltage correspondingly; for example, boost the charging voltage to 150% of the original. This can be achieved by increasing the duty radio of the duty radio adjustable PWM signal output to the MOS transistor Q1. For example, if the original duty radio is 60%, in order to boost the charging voltage, the duty radio is calculated and should be increased to 90%, and the microcontroller U1 outputs the duty radio adjustable PWM signal with the 90% duty radio to the gate of the MOS transistor Q1, and thus controls the conduction time of the MOS transistor Q1 to be extended. Only when the MOS transistor Q1 is conducted, the capacitor C is charged. Therefore, the energy accumulated in the charging process increases, so that the charging voltage output during the discharging process of the capacitor C is boosting to expected 150%.

In general, a voltage of the charge power source signal of the battery of the electronic cigarette case battery unit 110 is 3-4.2V, and a voltage of the power source signal of the battery of the electronic cigarette battery unit 220 is also 3-4.2V. Preferably, in the present embodiment, a voltage of the power source signal of the battery is 3.7V.

Regarding the calculation of the efficiency, in the present embodiment, the efficiency of DC-DC is 85%. When the external charging voltage of the battery rod gets close to the internal charging voltage of the battery from high to low, the voltage difference between the external charging voltage and the internal charging voltage reaches to the minimum, which is approximately 0.2V. Therefore, in the present embodiment, the charging voltage is (3.7+0.2) V, that is, 3.9V. When the electronic cigarette case charges the battery rod, the efficiency is 85%*(3.7/3.9). In the prior art, the charging efficiency of constant voltage charging is 85%*(3.7/5). It is obvious that the charging efficiency is greatly improved.

Figure 5:
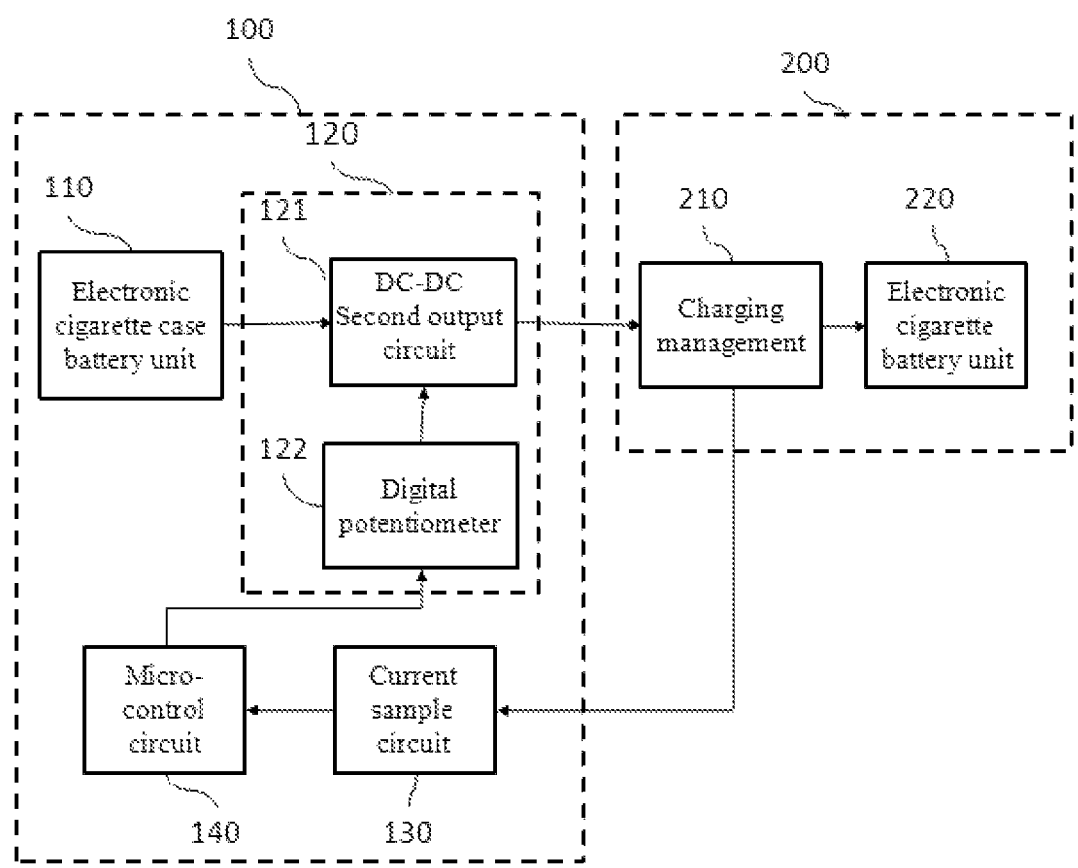
FIG. 5 illustrates a schematic view of an efficient electronic cigarette charging device according to a second embodiment of the present invention.

As shown in FIG. 5, which is a schematic view of an efficient electronic cigarette charging device according to a second embodiment of the present invention.

According to the second embodiment of the present invention, the efficient electronic cigarette charging device comprises an electronic cigarette case 100 and a battery rod 200.

The battery rod 200 includes a charging management unit 210 and an electronic cigarette battery unit 220.

The electronic cigarette case 100 includes an electronic cigarette case battery unit 110, a current sample unit 130, a micro-control unit 140 and an adjustable voltage output unit 120, wherein, the adjustable voltage output unit 120 includes a DC-DC second output circuit 121 and a digital potentiometer 122.

A first input port of the DC-DC second output circuit 121 is connected to an output port of the electronic cigarette case battery unit 110, an output port of the DC-DC second output circuit 121 is connected to an input port of the charging management unit 210, a first output port of the charging management unit 210 is connected to an input port of the current sample unit 130, a second output port of the charging management unit 210 is connected to an input port of the electronic cigarette battery unit 220, an output port of the current sample unit 130 is connected to an input port of the micro-control unit 140, an output port of the micro-control unit 140 is connected to an input port of the digital potentiometer 122, and an output port of the digital potentiometer 122 is connected to a second input port of the DC-DC second output circuit 121.

The electronic cigarette battery unit 110 provides a charge power signal to the DC-DC second output circuit 121, and the current sample unit 130 is configured to sample actual charging current of the charging management unit 210. The micro-control unit 140 is configured to determine whether a difference between default battery constant charging current and the actual charging current is within a preset range, and is configured to control to the transmission of voltage regulation control signals. The digital potentiometer 122 adjusts the resistance of an output sampling feedback resistor (not shown in the figures) of the DC-DC second output circuit 121 according to the voltage regulation control signal, and thus makes the DC-DC second output circuit 121 output the charging voltage that is real-timely adjusted to the charging management unit 210 (the technical means that using the digital potentiometer to adjust the DC-DC output sampling feedback resistor belongs to the prior art, and therefore is not described in detail here). Therefore, the actual charging current is equal to or slightly less than the battery constant charging current. By reducing the charging voltage difference between the charging voltage and the voltage of the electronic cigarette battery rod unit 220, the charge efficiency is increased. Specifically, in the second embodiment, the voltage regulation control signal is a voltage regulation digital control signal.

Specifically, if the difference between the constant battery charging current and the actual charging current is out of the preset range (generally, the actual charging current is less than or equal to the constant charging current), the microcontroller U1 transmits the voltage regulation digital control signal, the digital potentiometer 122 adjusts the resistance of the output sampling feedback resistor of the DC-DC second output circuit 121 according to the voltage regulation digital control signal, and further makes the DC-DC second output circuit 121 output the boosted charging voltage.

Preferably, in the second embodiment, the preset range is (0-10%)*the constant battery charging current.

For example, if the battery constant charging current is 100 mA, the preset range is (0-10%)*the constant battery charging current, that is, 0-10 mA.

If the actual charging current sampled by the sample unit is 60 mA, the difference between the constant battery charging current and the actual charging current is out of the preset range. On this occasion, the actual charging current may be increased to 90 mA. Therefore, in order to control the actual charging current output reaches to 90 mA, the microcontroller U1 should boost the charging voltage correspondingly; for example, boost the charging voltage to 150% of the original. The microcontroller U1 transmits a voltage regulation digital control signal to the digital potentiometer 122, the digital potentiometer 122 adjusts the resistance of the output sampling feedback resistor (not shown in the figures) of the DC-DC second output circuit 121 which is connected to the DC-DC conversion chip according to the voltage regulation digital control signal, and further adjusts the output voltage of the DC-DC second output circuit 121, that is, outputs the charging voltage that is real-timely adjusted, and makes it reach expected 150%

Figure 6:
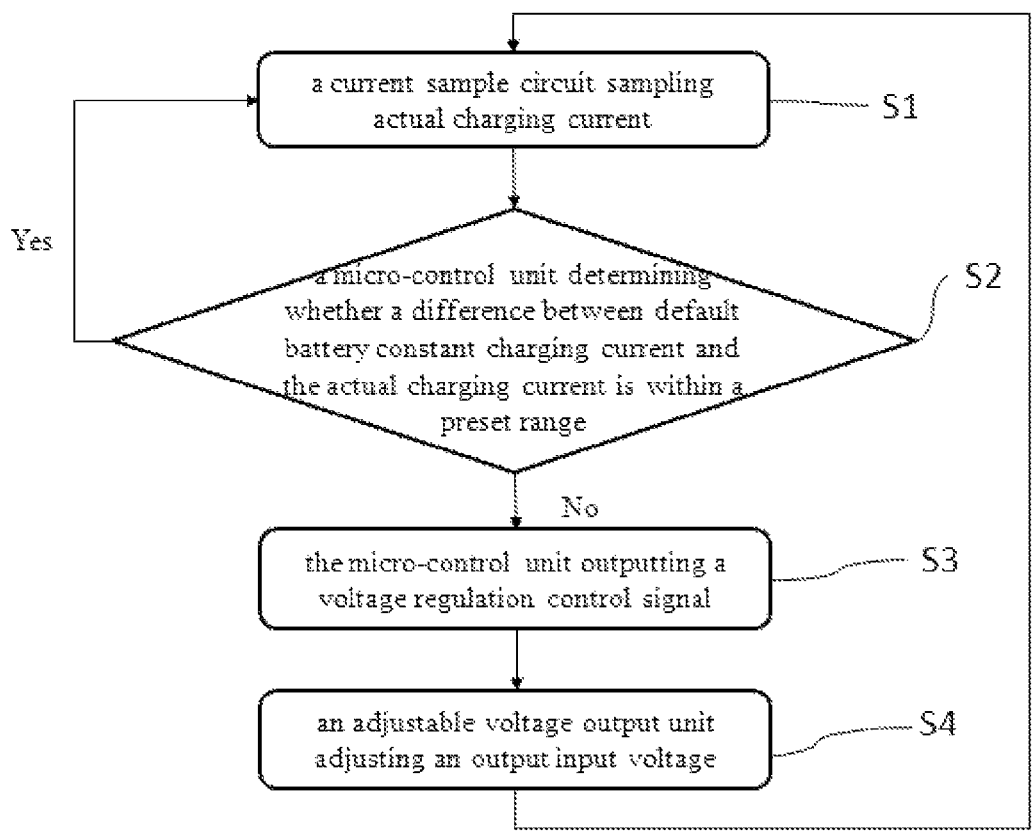
FIG. 6 is a flow chart of a method for efficiently charging an electronic cigarette, according to the present invention.

As shown in FIG. 6, which is a flow chart of a method for efficiently charging an electronic cigarette according to the present invention.

The method of the present invention includes the following steps:

S1, a current sample circuit 130 sampling actual charging current of a charging management unit 210;

S2, a micro-control unit 140 determining whether a difference between default constant battery charging current and the actual charging current is within a preset range;

S3, if the difference is within the preset range, executing the step S1; if the difference is out of the preset range, the micro-control unit 140 outputting a voltage regulation control signal;

S4, an adjustable voltage output unit 120 adjusting a charging voltage output to the charging management unit 210 according to the voltage regulation control signal, and executing the step S1.

Figure 7:
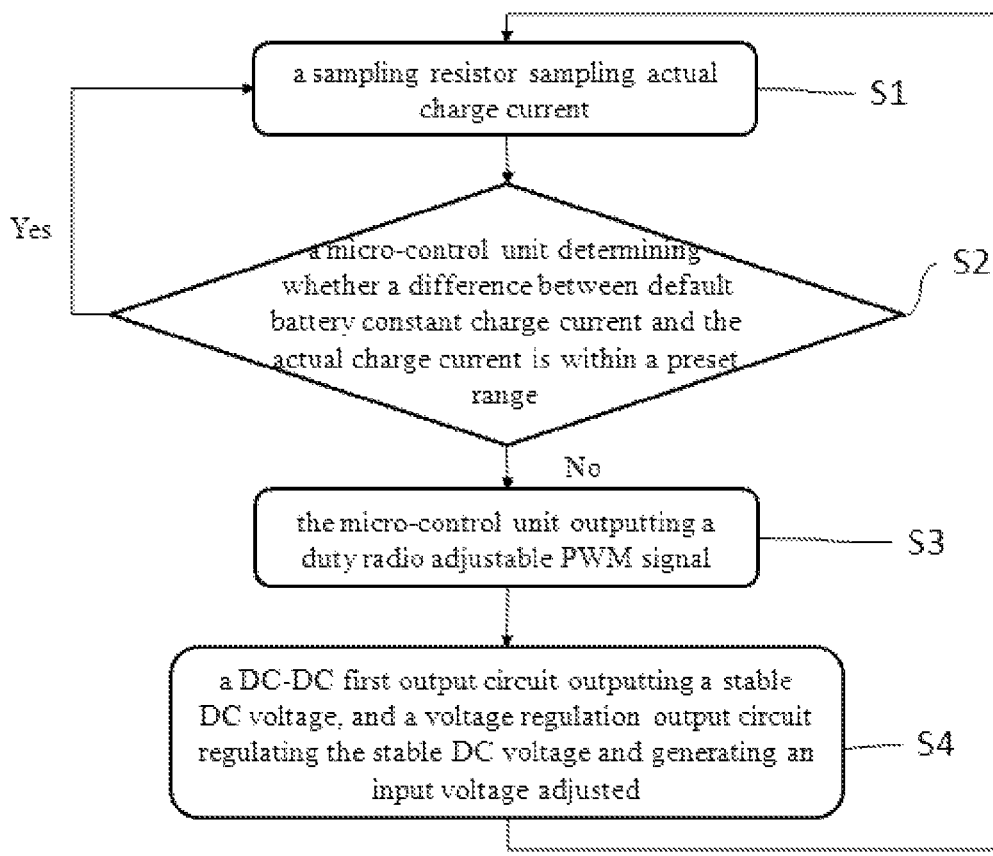
FIG. 7 illustrates a flow chart of a method for efficiently charging an electronic cigarette, according to a first embodiment of the present invention.

As shown in FIG. 7, which is a flow chart of a method for efficiently charging an electronic cigarette according to a first embodiment of the present invention.

The first embodiment includes the following steps:

S1, a sampling resistor R2 of a current sample circuit 130 sampling actual charging current of a charging management unit 210;

S2, a micro-control unit 140 determining whether a difference between default constant battery charging current and the actual charging current is within a preset range;

wherein, in the present embodiment, the preset range is (0-10%)*the constant battery charging current;

S3, if the difference is within the preset range, executing the step S1; otherwise, the microcontroller U1 outputting a duty radio adjustable PWM signal;

S4, an adjustable voltage output unit 120 adjusting a charging voltage output to the charging management unit 210 according to the duty radio adjustable PWM signal, and making the actual charging current be equal to or slightly less than the constant battery charging current, and then returning to the step S1.

Specifically, S4 includes the following steps:

S41, a DC-DC first output circuit converting a power signal provided by an electronic cigarette case battery unit to a stable DC voltage and outputting the stable DC voltage, wherein, in the present embodiment, the stable DC voltage is 5V;

S42, a voltage regulation output circuit regulating the stable DC voltage according to the duty radio adjustable PMW signal and generating the charging voltage that is adjusted.

Specifically, a source of a MOS transistor Q1 of the voltage regulation output circuit receives the stable DC voltage of the DC-DC first output circuit, and a gate of the MOS transistor Q1 receives the duty radio adjustable PWM signal, thus controls the conduction and cut-off of the MOS transistor Q1, and further controls the stable DC voltage charges a capacitor C. The capacitor C provides the energy accumulated in the charging process by means of discharging and outputting the charging voltage to the charging management unit 210.

Figure 8:
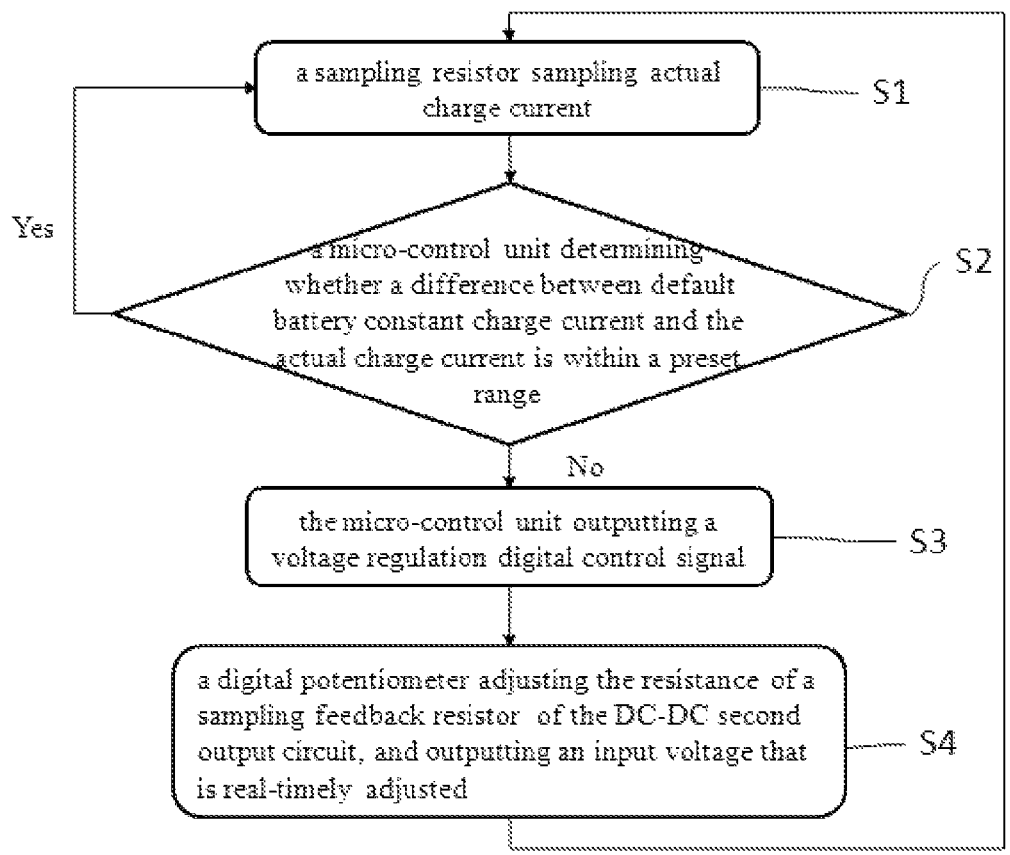
FIG. 8 is a flow chart of a method for efficiently charging an electronic cigarette, according to a second embodiment of the present invention.

As shown in FIG. 8, which is a flow chart of a method for efficiently charging an electronic cigarette efficient charging, according to a second embodiment of the present invention.

The second embodiment includes the following steps:

S1, a sampling resistor R2 of a current sample circuit 130 sampling actual charging current of a charging management unit 210;

S2, a micro-control unit 140 determining whether a difference between default battery constant charging current and the actual charging current is within a preset range;

wherein, in the present embodiment, the preset range is (0-10%)*the constant battery charging current;

S3, if the difference is within the preset range, executing the step S1; otherwise, the microcontroller U1 outputting a voltage regulation digital control signal;

S4, an adjustable voltage output unit 120 adjusting a charging voltage output to the charging management unit 210 according to the voltage regulation digital control signal, making the actual charging current be equal to or slightly less than the battery constant charging current, and then executing the step S1.

Specifically, S4 includes the following steps:

S41', a digital potentiometer receiving the voltage regulation digital control signal, and adjusting a resistance of a sampling feedback resistor of a DC-DC second output circuit;

S42', the DC-DC second output circuit outputting the charging voltage that is real-timely adjusted to the charging management unit.

Those mentioned above are the detailed descriptions of the embodiments accompanying the drawings. However, the present invention is not limited to the embodiments above. The embodiments herein are just for the illustration, and do not imply a limitation to the present invention. In the inspiration of the present invention, those ordinary skills in the art can also make many modifications without breaking away from the subject of the present invention and the protection scope of the claims. All these modifications belong to the protection of the present invention.

What is claimed is:

1. An efficient electronic cigarette charging device, comprising an electronic cigarette case and a battery rod; the battery rod including a charging management unit and an electronic cigarette battery unit;

wherein the electronic cigarette case includes an electronic cigarette case battery unit, a current sample unit, a micro-control unit, and a voltage regulator unit;

wherein the voltage regulator unit is connected to the electronic cigarette case battery unit, the micro-control unit, and the charging management unit respectively, and the current sample unit is connected to the charging management unit and the micro-control unit respectively;

wherein the current sample unit is configured to sample actual charging current of the charging management unit, and the micro-control unit is configured to determine whether a difference between default battery constant charging current and the actual charging current is within a preset range, and is further configured to control transmission of a control signal to the voltage regulator unit to adjust a charging voltage outputted to the charging management unit;

wherein the voltage regulator unit includes a DC-DC output circuit and a voltage regulation output circuit, the DC-DC output circuit is configured to convert a power voltage provided by the electronic cigarette case battery unit to a stable DC voltage and output the stable DC voltage to the voltage regulation output circuit, and the voltage regulation output circuit is configured to regulate the stable DC voltage according to the control signal and then generate the charging voltage that is regulated;

wherein the voltage regulation output circuit includes a MOS transistor and a capacitor, a drain of the MOS transistor is connected to the charging management unit, a source of the MOS transistor is connected to the DC-DC output circuit, a gate of the MOS transistor is connected to the micro-control unit, one end of the capacitor is connected to the drain of the MOS transistor, and the other end of the capacitor is grounded; and wherein the MOS transistor is configured to receive the stable DC voltage from the source thereof and receive the control signal from the gate thereof, and the control signal controls the conduction and cut-off of the MOS transistor, and hence controls the charging voltage.

2. The efficient electronic cigarette charging device according to claim 1, wherein control signal is a duty radio adjustable PWM signal; and the voltage regulation output circuit is configured to regulate the stable DC voltage according to the duty radio adjustable PMW signal and generate the charging voltage that is regulated.

3. The efficient electronic cigarette charging device according to claim 2, wherein, the micro-control unit includes a microcontroller and a first resistor; a type of the microcontroller is SN8P2711B; a PWM1 pin of the microcontroller is connected to one end of the first resistor and the gate of the MOS transistor respectively, and the PWM1 pin of the microcontroller outputs the duty radio adjustable PWM signal; the other end of the first resistor is connected to the source of the MOS transistor, a VSS pin of the microcontroller is grounded, and a VDD pin of the microcontroller is connected to a power signal Vbat.

4. The efficient electronic cigarette charging device according to claim 3, wherein the current sample unit includes a sampling resistor, one end of the sampling resistance is grounded, and the other end is connected to the charging management unit and a P4.4 pin of the microcontroller respectively.

5. The efficient electronic cigarette charging device according to claim 4, wherein the resistance of the sampling resistor is 1-2 Ω.

6. The efficient electronic cigarette charging device according to claim 1, wherein the stable DC voltage is 5V.

7. The efficient electronic cigarette charging device according to claim 1, wherein the MOS transistor is a P-type MOS transistor.

8. The efficient electronic cigarette charging device according to claim 7, wherein a type of the MOS transistor is A03401.

* * * * *